Feb. 20, 1968 M. D. FISKE 3,370,210

MAGNETIC FIELD RESPONSIVE SUPERCONDUCTING TUNNELING DEVICES

Filed Dec. 28, 1965

Inventor:
Milan D. Fiske,
by Richard A. Spear
His Attorney.

3,370,210
MAGNETIC FIELD RESPONSIVE SUPERCONDUCTING TUNNELING DEVICES

Milan D. Fiske, Burnt Hills, N.Y., assignor to General Electric Company, a corporation of New York Filed Dec. 28, 1965, Ser. No. 516,980
6 Claims. (Cl. 317—235)

This invention relates to superconductive devices and more particularly to superconductive tunneling devices including magnetic field creating means for changing the maximum quantity of supercurrent capable of being passed through a tunneling junction.

The phenomenon of superconductive electron tunneling is one which is well known and occurs when superposed strips of superconductive metals are insulated from each other excepting for an area which is most often called the tunneling junction and which consists of an oxide layer of one of the two superconductive metals. Generally speaking, the thickness of this oxide film will not exceed 50 A. Specifically, it would be preferred that it not exceed 10 A. thickness for supercurrent tunneling and in all cases the oxide film must be continuous, that is, free of flaws so that electric shorting between the superposed metal strips or films cannot take place. When such a combination of elements is constructed and a source of current connected to the two metal films, electron tunneling occurs at the tunneling junction and different results will be effected depending upon the conditions superimposed upon the system. The present invention is concerned with a type of tunneling in which there is current flow through the tunneling junction without any voltage drop up to a critical current ($I_J$), above which some voltage drop begins to occur. This type of behavior has been called in the art "Josephson superconductive tunneling," or "supercurrent tunneling."

It is a principal object of this invention to provide a supercurrent tunneling device having electrically conductive control means for changing the critical current carrying capacity of the tunneling device.

Another object of this invention is to provide a supercurrent tunneling device capable of performing switching operations.

Other objects and advantages of this invention will be in part obvious and in part explained by reference to the accompanying specification and drawings.

Figures 1, 2, 2A, 3, 4, 4A:
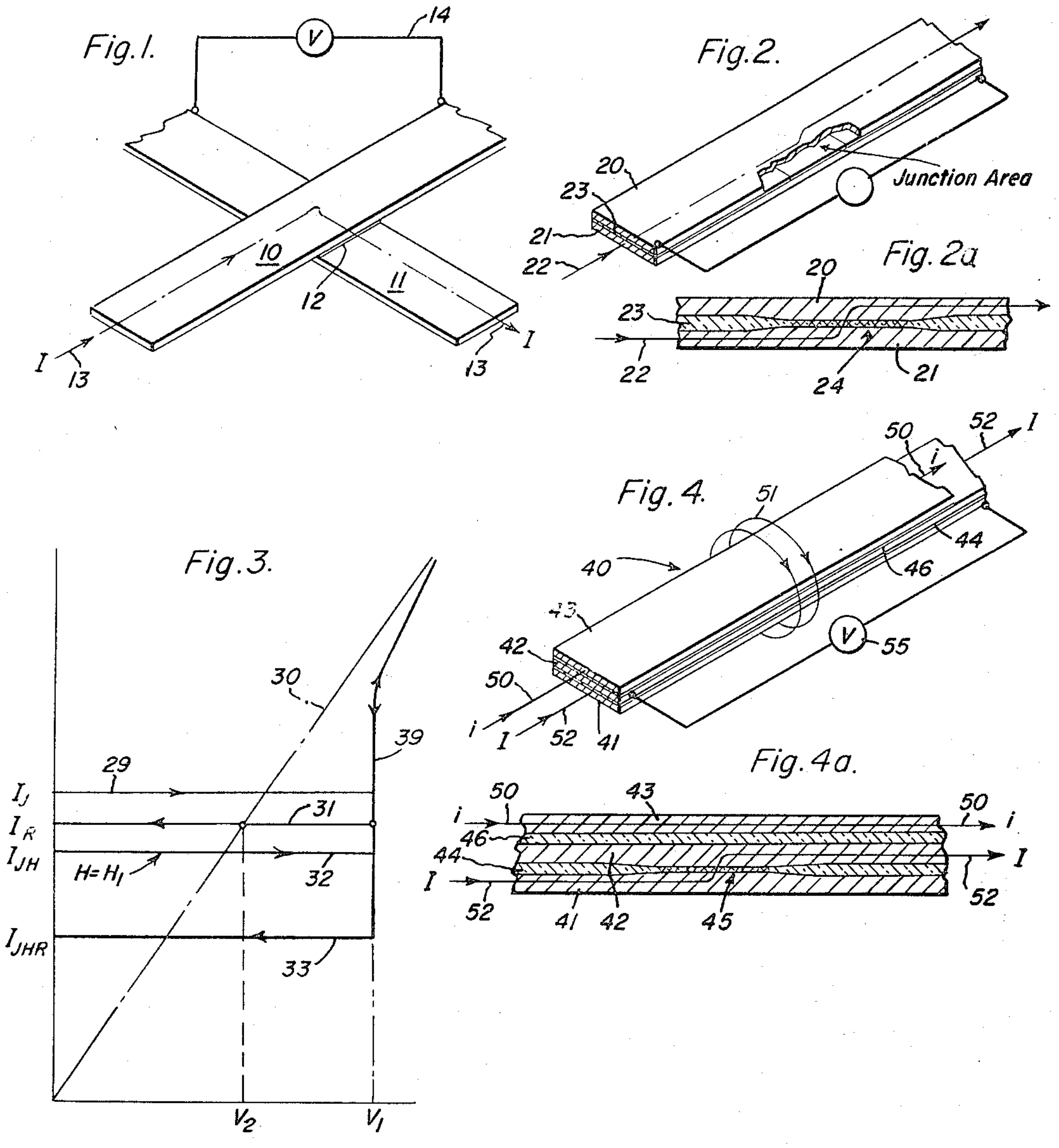
FIG. 1 is a partially schematic view showing the usual type of crossed-film tunneling junction.
FIG. 2 is a partially schematic view of a tunneling device of different geometric configuration from that of FIG. 1.
Figure 5:
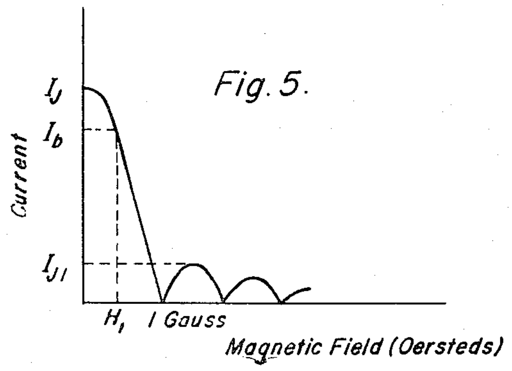

FIG. 2*a* is a longitudinal section of the device of FIG. 2 showing the manner in which current flows through the junction;

FIG. 3 is a current vs. voltage plot illustrating the electrical properties of supercurrent tunneling junctions;

FIG. 4 is a partially schematic view showing a supercurrent tunneling junction constructed in accordance with the present invention;

FIG. 4*a* is a longitudinal section showing the construction of the device of FIG. 4; and FIG. 5 is a graphic plot illustrating the relationship between the critical current carrying capacities of the devices of this invention as a function of applied magnetic field.

Broadly, this invention concerns a supercurrent tunneling device which is comprised of a laminated body and means for connecting the body into an electric circuit to change or control the maximum quantity of supercurrent which will pass through the device. The laminated body includes at least two superconductive metal films or sheets and these films are separated by an insulating film or layer that precludes the flow of electric current between them. A tunneling area is provided between the superconductive metal films which bridges the insulating film to provide for the flow of supercurrent through the insulating film. Electrically conductive control means is situated or positioned operably adjacent the tunneling junction or area in a manner such that the magnetic flux field resulting from the flow of current through it passes through the plane of the tunneling junction.

The usual geometry of a tunneling junction employs crossed superconducting strips with a thin layer of insulation between them. This configuration is illustrated in FIG. 1 where numerals 10 and 11 designate the crossed superconductive films and numeral 12 designates the insulating layer. Current tunneling occurs through 12 over the area common to 10 and 11 and thereby permits flow along the path 13. The voltage across the junction can be determined by conventional means such as voltmeter circuits.

A more detailed understanding of the nature of the tunneling junction can be obtained by referring to FIGS. 2 and 2*a* where superconductive films 20 and 21 are shown assembled in an improved geometry. In this arrangement, the strips are parallel to each other so that magnetic fields generated by tunneling current flowing along the path 22 are all perpendicular to the length of the strips. Strips 20 and 21 are separated by an electrically insulating film 23, such as SiO or the like, except for an area where current tunneling is to take place. This area, designated by numeral 24, constitutes the tunneling junction bridging insulating film 23 and may be constituted advantageously of an oxide of the superconductive strips 20 and 21. A suitable oxide can be formed conveniently by oxidizing one of the strips in a selected area to a thickness of not more than 50 A. and preferably around 10 A. The oxidized area must be continuous, that is free of any flaws that would permit electrical shorting to occur between the superconductive films.

The current-voltage characteristics of supercurrent tunneling junctions of the type described above and the type with which this invention is concerned, can be seen by reference to FIG. 3. The graph shows the current-voltage characteristic in a constant-current circuit; that is, one in which the current I is externally controlled to be independent of the voltage drop V. In such a circuit the current can be increased to a value $I_J$ before any voltage drop appears. As I is further increased a voltage drop V suddenly appears and remains substantially constant (curve 39) until the line 30 is approached with which it then blends asymptotically. Line 30 is the current-voltage tunneling characteristic when both films 20 and 21 are in the normal conductive state. Hysteresis is typically seen with reducing current with the return to zero voltage at a current $I_R$ lower than $I_J$, as shown by curve 31.

I have found that the value of $I_J$ can be controlled or varied by subjecting the tunneling junction to a magnetic field passed through the plane of the junction. Thus, a junction subjected to a magnetic field $H_1$ would pass a current $I_{JH}$ (FIG. 3) before voltage drop along the curve 32 would begin. With reduction in current flow, hysteresis occurs with voltage returning to zero along curve 33 at the reduced current value $I_{JHR}$. The relationship between the maximum voltage-free current flow $I_J$ and an applied magnetic field is illustrated clearly in FIG. 5. Referring to this figure, it will be noted that a junction will pass a maximum current $I_J$ when no externally applied field is present. With the application of a magnetic field of strength $H_1$, the maximum current is dropped to a lesser value $I_1$. When a field of slightly greater than one gauss is used the current flow passes through a peak value $I_{J1}$, which is substantially less than $I_J$. As the strength of the applied magnetic field is further increased the quantity of current which a junction will pass with no voltage drop decreases in the manner illustrated by the curve of FIG. 5. The marked field-dependent characteristics of the supercurrent tunneling junctions of this invention render them uniquely suitable for use as switching devices.

A supercurrent tunneling device of preferred geometry is illustrated in FIGS. 4 and 4*a* of the drawings. This device which can be used for switching operations comprises a laminated body 40, the laminated body including two films 41 and 42 of superconducting metal and a third film 43 which can be either a superconducting metal or of a metal not capable of being rendered superconductive. Films 41 and 42 are separated by an insulating film 44 except in the region 45 (see FIG. 4*a*) of supercurrent tunneling. The insulating film can advantageously be composed of a substance such as vapor-deposited SiO, although many other insulating materials may be used as effectively. The superconducting film 42 is separated from the film 43 by means of an insulating layer 46 similar to the insulating film 44 with the exception that this film is continuous so that no current can flow between films 42 and 43.

The film 43 is connected as by means of wires 50 to a source of control current *i* so that current flow can occur along the path *i—i* indicated in FIG. 4*a*. This film thus constitutes control means whereby a magnetic field is created which passes through the plane of the tunneling junction 45. The direction of the magnetic field created by the control film 43 is indicated by the numeral 51 in FIG. 4. Means such as wires 52 are used for connecting the films 41 and 42 in an electric circuit so that current will flow along the path I—I as shown in FIG. 4*a* of the drawings.

In operation, the device is connected in an electric circuit and a control current sent through the electromagnetic control means, viz. film 43, so that the tunneling junction 45 is subjected to magnetic flux arising from the control means. The control means is thus positioned operatively adjacent the laminated body in a fashion such that the flux field arising from it passes laterally through the plane of the tunneling junction. Depending upon the magnitude of the control current *i*, the device will pass different quantities of current I under voltage-free conditions. When the maximum current $I_{JH}$ is exceeded, the voltage-free condition is altered. This change in conditions can be identified by connecting a voltmeter 55 across the two superconducting films 41 and 42 or, rather than a voltmeter, the output could be supplied to other voltage-responsive devices to control other circuitry or to cause some response which the operator may wish to make use of.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A supercurrent tunneling device comprising an elongated laminated body, and means for connecting the body in an electric circuit, said laminated body comprising two coextensive films of superconductive metal, a coextensive insulating film between the superconductive metal films preventing the flow of electric current therebetween, a tunneling junction bridging the insulating film at one region of said elongated body and connecting the superconductive metal films for current flow through said tunneling junction, and electrically conductive control means positioned operably adjacent said laminated body such that magnetic flux resulting from the flow of current therethrough passes through the plane of the tunneling junction.

2. A device as defined in claim 1 wherein said tunneling junction comprises an oxide compound film of at least one of the superconductive metal films which will permit the passage of supercurrent.

3. A device as defined in claim 2 wherein said oxide compound film is not more than approximately 15 A. thick.

4. A superconductive switching device comprising, a pair of adjacent elongated and coextensive films of superconductive metal, an electrically insulating film in contact and coextensive with and effecting separation between the superconductive metal films, a metal oxide which will permit the passage of supercurrent therethrough connecting the pair of adjacent films of superconductive metal and defining a tunneling junction, means for connecting the films of superconductive metal in an electric circuit, and magnetic flux field generating control means comprising a third metallic film coextensive with said pair of superconducting films and separated therefrom by a second insulating film and providing a path for an electric current which provides a magentic field with flux lines passing through said superconducting films.

5. A device as defined by claim 4 wherein said third conducting film is also a superconductor.

6. A device as defined by claim 4 wherein said third conducting film is a normal conductor.

References Cited

UNITED STATES PATENTS

| | | | |
|---|---|---|---|
| 3,175,198 | 3/1965 | Burns | 340—173.1 |
| 3,259,759 | 7/1966 | Giaever | 307—88.5 |
| 3,281,609 | 10/1966 | Rowell | 307—88.5 |

OTHER REFERENCES

I.B.M. Technical Disclosure Bulletin, vol. 7, No. 3, August 1964 (p. 271), article by M. Merriam.

JOHN W. HUCKERT, *Primary Examiner.*

M. EDLOW, *Assistant Examiner.*